US011840340B2

(12) United States Patent
Yamato et al.

(10) Patent No.: US 11,840,340 B2
(45) Date of Patent: Dec. 12, 2023

(54) UNMANNED AERIAL VEHICLE AND WATERPROOF CONTAINER (71) Applicant: RAKUTEN GROUP, INC., Tokyo (JP)

(72) Inventors: Takumi Yamato, Tokyo (JP); Kenichi Lee, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 528 days.

(21) Appl. No.: 16/973,045

(22) PCT Filed: Mar. 26, 2019

(86) PCT No.: PCT/JP2019/012969
§ 371 (c)(1),
(2) Date: Dec. 8, 2020

(87) PCT Pub. No.: WO2020/194533
PCT Pub. Date: Oct. 1, 2020

(65) Prior Publication Data
US 2021/0171195 A1 Jun. 10, 2021

(51) Int. Cl.
B64D 1/12 (2006.01)
B64C 39/02 (2023.01)
(Continued)

(52) U.S. Cl.
CPC ............. B64D 1/12 (2013.01); B64C 39/024 (2013.01); B64U 30/20 (2023.01); B64U 50/19 (2023.01);
(Continued)

(58) Field of Classification Search
CPC ........ B64D 1/06; B64D 1/12; B64U 2101/64; B64U 2101/69
See application file for complete search history.

(56) References Cited

U.S. PATENT DOCUMENTS 5,967,462 A 10/1999 Foster et al.
6,663,047 B1 * 12/2003 Arata ................. B64D 1/06
89/1.51
(Continued)

FOREIGN PATENT DOCUMENTS

JP 2015117003 A 6/2015
WO 2018042610 A1 3/2018

OTHER PUBLICATIONS

Search Report dated Jun. 2, 2021, for corresponding EP Patent Application No. 19921071.7 pp. 1-9.

Primary Examiner — Jessica B Wong
(74) Attorney, Agent, or Firm — HEA LAW PLLC (57) ABSTRACT Provided is an unmanned aerial vehicle including a waterproof container including: a container main body having an opening in a bottom surface defined in a landed state of the unmanned surface aerial vehicle; a waterproof door mounted to the container main body so as to open outward and close the opening; an elastic seal, which is interposed between the container main body and the waterproof door, and is configured to close the waterproof door in a liquid-tight manner; a first door-closing mechanism configured to retain a first door-closing state of the waterproof door; and a second door-closing mechanism configured to prevent movement of the waterproof door in a door-opening direction in a second door-closing state in which the waterproof door has been pushed in a direction of resisting against an elastic force of the elastic seal from the first door-closing state.

10 Claims, 9 Drawing Sheets (51) Int. Cl.
*B64U 30/20* (2023.01)
*B64U 50/19* (2023.01)
*B64U 101/64* (2023.01)

(52) U.S. Cl.
CPC ...... *B64U 2101/64* (2023.01); *B64U 2201/20* (2023.01)

(56) References Cited

U.S. PATENT DOCUMENTS

| | | | |
|---|---|---|---|
| 2018/0251221 A1* | 9/2018 | Chu | B64D 1/02 |
| 2019/0176974 A1 | 6/2019 | Sugaki | |
| 2021/0214082 A1* | 7/2021 | Inuma | B64D 9/00 |
| 2022/0081112 A1* | 3/2022 | Inuma | B66D 1/525 |
| 2022/0119104 A1* | 4/2022 | Barnes | B64C 39/024 |
| 2022/0274705 A1* | 9/2022 | Sly | B64D 1/04 |

* cited by examiner

UNMANNED AERIAL VEHICLE AND WATERPROOF CONTAINER

CROSS REFERENCE TO RELATED APPLICATIONS

This application is a National Stage of International Application No. PCT/JP2019/012969 filed on Mar. 26, 2019. The contents of the above document is incorporated herein by reference in its entirety.

TECHNICAL FIELD

The present invention relates to an unmanned aerial vehicle and a waterproof container.

BACKGROUND ART

It is expected that opportunities of using an unmanned aerial vehicle (drone) for transport on the sea increase in the future. There exist drones including a float such as a member having buoyancy (for example, foaming polystyrol) or a hollow air chamber (WO 2018/042610 and Japanese Patent Application Laid-open No. 2015-117003).

CITATION LIST

Patent Literature

[PTL 1] WO2018/042610A1
[PTL 2] JP 2015-117003 A

SUMMARY OF INVENTION

Technical Problem

It is desired that the float be as small as possible. However, in order to deal with transport of a large package, a large float is required. In view of such a circumstance, it is desired that a container be utilized as a float. However, a container does not function as a float unless the container is completely and hermetically sealed. Further, the container cannot maintain waterproofness unless a door of the container is completely closed.

One or more embodiments of the present invention are directed to secure hermetic sealing of a container.

Solution to Problem (1) An unmanned aerial vehicle according to one or more embodiments of the present invention is an unmanned aerial vehicle including a waterproof container configured to accommodate a package, the waterproof container including: a container main body having an opening in a bottom surface defined in a landed state of the unmanned aerial vehicle; a waterproof door mounted to the container main body so as to open outward and close the opening; an elastic seal, which is interposed between the container main body and the waterproof door, and is configured to close the waterproof door in a liquid-tight manner; a first door-closing mechanism configured to retain a first door-closing state of the waterproof door; and a second door-closing mechanism configured to prevent movement of the waterproof door in a door-opening direction in a second door-closing state in which the waterproof door has been pushed in a direction of resisting against an elastic force of the elastic seal from the first door-closing state.

According to one or more embodiments of the present invention, when the waterproof door is pushed by an external force, hermetic sealing with the waterproof door can be enhanced from the first door-closing state to the second door-closing state, thereby being capable of securing the hermetic sealing of the waterproof container.

(2) The unmanned aerial vehicle according to Item (1), the waterproof door may be a double door including a first door and a second door.

(3) In the unmanned aerial vehicle according to Item (1) or (2), the elastic seal may be interposed also between the first door and the second door.

(4) In the unmanned aerial vehicle according to any one of Items (1) to (3), the first door-closing mechanism and the second door-closing mechanism may be included in a locking mechanism having a plurality of locking levels.

(5) In the unmanned aerial vehicle according to any one of Items (1) to (4), the unmanned aerial vehicle may further include a pressure adjustment valve mounted to the container main body.

(6) In the unmanned aerial vehicle according to any one of Items (1) to (5), the waterproof door may include a float.

(7) In the unmanned aerial vehicle according to any one of Items (1) to (6), the waterproof door may include: a first-side end portion extending along a rotation shaft for opening and closing; and a second-side end portion located on a side opposite to the first-side end portion, and an outer surface of the waterproof door may be a surface generated by translation of the rotation shaft and be inclined toward the first-side end portion.

(8) In the unmanned aerial vehicle according to Item (7), the outer surface may be a curved surface.

(9) In the unmanned aerial vehicle according to any one of Items (1) to (8), the unmanned aerial vehicle may further include a parachute.

(10) In the unmanned aerial vehicle according to any one of Items (1) to (9), the unmanned aerial vehicle may further include a radio configured to perform at least one of transmission or reception of signals.

(11) A waterproof container according to one or more embodiments of the present invention is a waterproof container including: a container main body having an opening in a bottom surface; a waterproof door, which is mounted to the container main body so as to open outward and close the opening, and is a double waterproof door including a first door and a second door; an elastic seal, which is interposed between the first door and the container main body and between the second door and the container main body, and is configured to close the waterproof door in a liquid-tight manner; a first door-closing mechanism configured to retain a first door-closing state of each of the first door and the second door; and a second door-closing mechanism configured to prevent movement of the first door and the second door in respective door-opening directions in a second door-closing state in which the first door and the second door are each pushed in a direction of resisting against an elastic force of the elastic seal from the first door-closing state.

According to one or more embodiments of the present invention, when the waterproof door is pushed by an external force, hermetic sealing with the waterproof door is enhanced from the first door-closing state to the second door-closing state. With this, the hermetic sealing of the waterproof container can be secured.

(12) In the waterproof container according to (11), the elastic seal may be interposed also between the first door and the second door.

(13) In the waterproof container according to (11) or (12), the first door-closing mechanism and the second door-closing mechanism may be included in a locking mechanism having a plurality of locking levels.

(14) In the waterproof container according to any one of Items (11) to (13), the waterproof container may further include a pressure adjustment valve mounted to the container main body.

(15) In the waterproof container according to any one of Items (11) to (14), the first door and the second door may each include a float.

(16) In the waterproof container according to any one of Items (11) to (15), the first door and the second door may each include: a first-side end portion extending along a rotation shaft for opening and closing; and a second-side end portion located on a side opposite to the first-side end portion, and wherein an outer surface of each of the first door and the second door may be a surface generated by translation of the rotation shaft and may be inclined toward the first-side end portion.

(17) In the waterproof container according to Item (16), the inclined surface may be a curved surface.

DESCRIPTION OF EMBODIMENTS

Now, embodiments of the present invention are described with reference to the drawings. The present invention can be implemented by various modes without departing from the gist of the present invention, and is not to be construed as being limited to the contents of exemplary embodiments described below.

Figure 1:
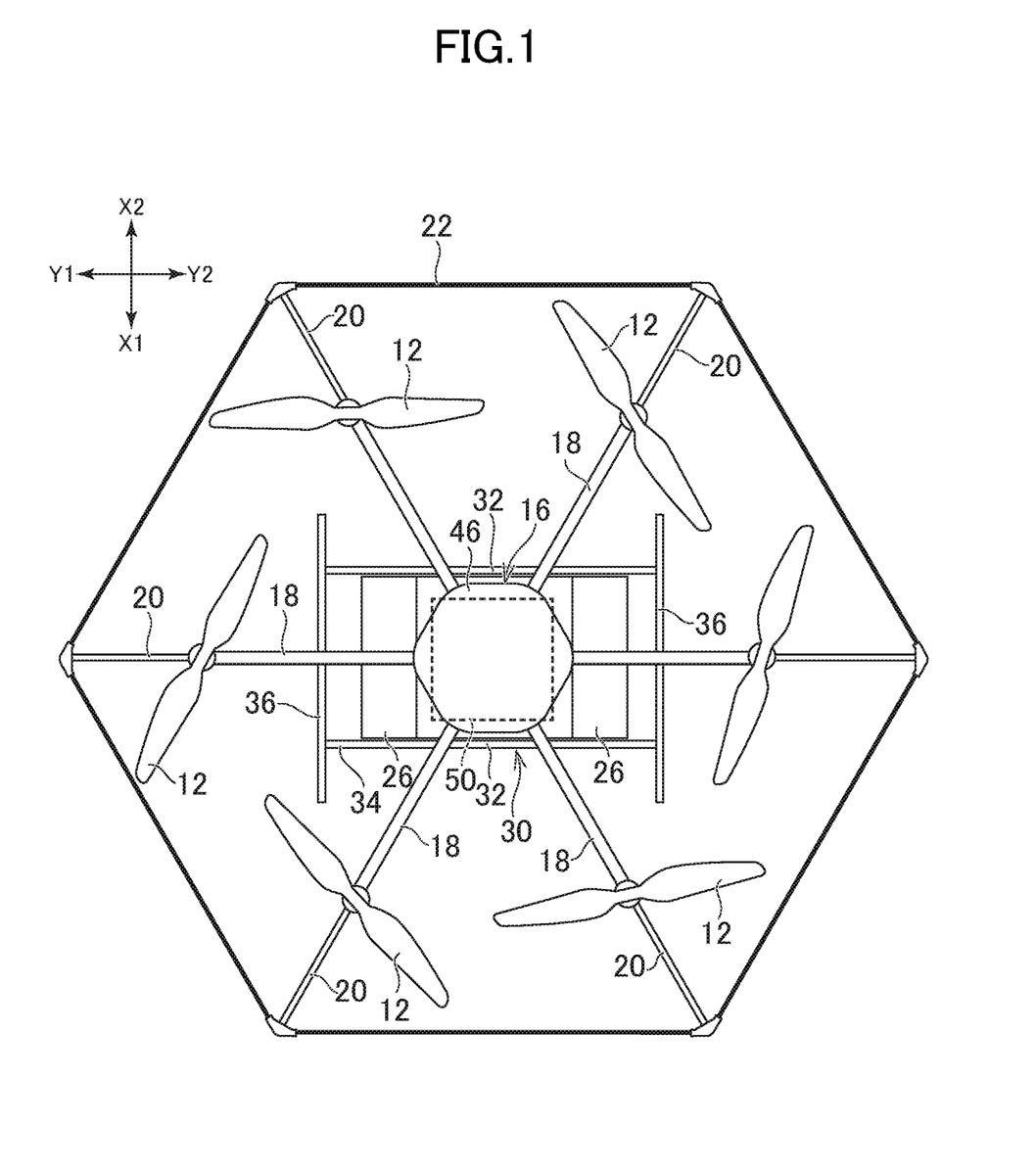
FIG. 1 is a plan view of an unmanned aerial vehicle according to an embodiment.
Figure 2:
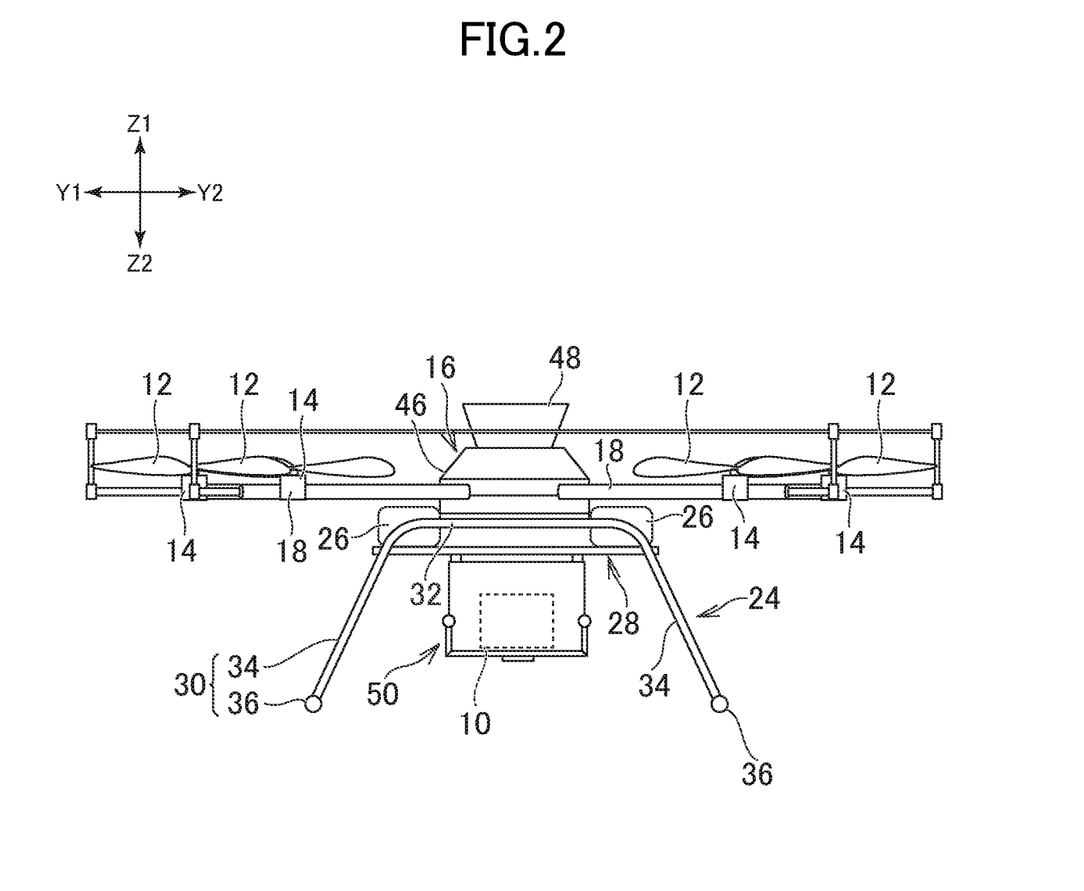
FIG. 2 is a side view of the unmanned aerial vehicle illustrated in FIG. 1.

FIG. 1 is a plan view of an unmanned aerial vehicle according to an embodiment of the present invention. FIG. 2 is a side view of the unmanned aerial vehicle illustrated in FIG. 1. In the following description, an X1 direction and an X2 direction are referred to as "right" and "left", respectively. A Y1 direction and a Y2 direction are referred to as "front" and "back", respectively. A direction extending along a plane defined by X1-X2 and Y1-Y2 is referred to as "horizontal direction". A Z1 direction and a Z2 direction are referred to as "up" and "down", respectively.

The unmanned aerial vehicle is to be used for transportation of a package 10 such as containing, for example, consumer necessities, foods, electronic devices, or books. Delivery destinations include an isolated island, and flight paths include paths above water, such as the sea, a river, and a lake. The unmanned aerial vehicle may be remotely controlled by a radio system, or may autonomously fly after a target position (landing position) is designated.

The unmanned aerial vehicle is a multicopter capable of taking off and landing in a vertical direction. The unmanned aerial vehicle includes a plurality of propellers 12 and a plurality of motors 14. The motors 14 are configured to rotate the propellers 12, respectively. The motors 14 may be located at positions directly under centers of the propellers 12 or may be located at positions which are not directly under the centers of the propellers 12. The propellers 12 and the motors 14 are arranged at equal intervals in a circumferential direction about an apparatus main body 16. The unmanned aerial vehicle includes the apparatus main body 16 at a center portion thereof.

The unmanned aerial vehicle includes a plurality of support arms 18 extending from the apparatus main body 16 in the horizontal direction. The support arms 18 support the motors 14 at positions apart from the apparatus main body 16. The support arms 18 include extension portions 20 further extending from the positions of the motors 14. The extension portions 20 support, at respective end portions thereof, a guard cable 22 surrounding the entirety of the plurality of propellers 12.

The unmanned aerial vehicle includes a support frame 24. The support frame 24 includes a frame upper portion 28 and a frame lower portion 30. The frame upper portion 28 is configured to support, for example, the apparatus main body 16 and batteries 26. The frame lower portion 30 extends downward from the frame upper portion 28. The frame upper portion 28 includes two horizontal bars 32, which are apart from each other in the right-and-left direction and extend in the horizontal direction.

The frame lower portion 30 includes a plurality of leg portions 34 extending downward from the horizontal bars 32. The frame lower portion 30 includes a plurality of lower-end bars 36, which extend in the horizontal direction and are connected to respective lower ends of the plurality of leg portions 34. Lower ends of the frame lower portion 30 (that is, the lower-end bars 36) are located below a lower end of a waterproof container 50 described later, to thereby support the unmanned aerial vehicle on the ground and prevent contact between the waterproof container 50 and the ground at the time of landing of the unmanned aerial vehicle.

The structure of the support frame 24 is not limited to the example described above. For example, the support frame 24 may include a plate-like support base on which the batteries 26 and the apparatus main body 16 are mounted, and the leg portions 34 may extend downward from the support base.

The unmanned aerial vehicle includes one or a plurality of batteries 26. The motors 14 are driven by electric power supplied from the batteries 26. The batteries 26 are arranged at the center portion of the unmanned aerial vehicle. The batteries 26 are supported by the support frame 24 provided at the center portion of the unmanned aerial vehicle.

Figure 3:
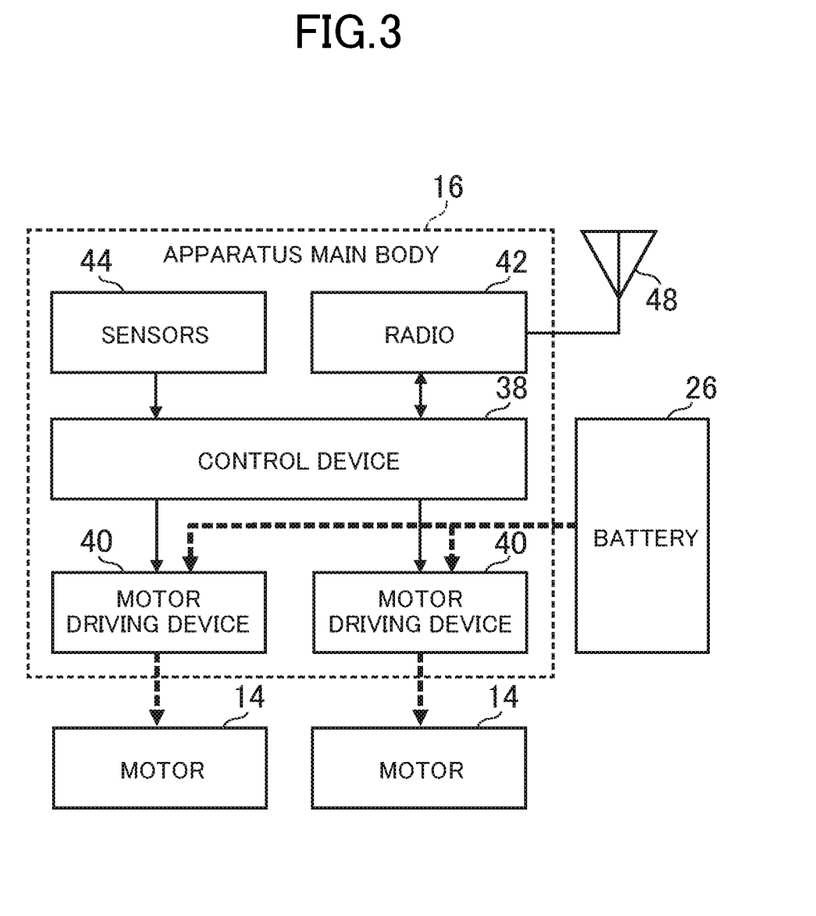
FIG. 3 is a functional block diagram of an apparatus main body.

FIG. 3 is a functional block diagram of the apparatus main body 16. The apparatus main body 16 includes a control device 38, motor driving devices 40, a radio 42, and sensors 44. The apparatus main body 16 includes a housing 46 (FIG. 1 and FIG. 2) configured to accommodate, for example, the control device 38 and the radio 42. Moreover, the apparatus main body 16 may include, besides the batteries 26 for driving the motors 14, a battery configured to store electric power to be supplied to the control device 38.

The sensors 44 include, for example, a 3-axis gyrosensor and a 3-axis acceleration sensor. The 3-axis gyrosensor is configured to output, for example, signals associated with a pitch angle, a roll angle, and a yaw angle of the unmanned aerial vehicle. The 3-axis acceleration sensor is configured to output signals associated with acceleration of the unmanned aerial vehicle, specifically, acceleration in the front-and-back direction, acceleration in the right-and-left direction, and acceleration in the up-and-down direction. Kinds of sensors included in the sensors 44 are not limited to the 3-axis gyrosensor and 3-axis acceleration sensor. For example, the sensors 44 may further include a geomagnetic sensor configured to output signals associated with directions of the unmanned aerial vehicle.

The radio 42 is a device configured to perform at least one of transmission or reception of signals. The radio 42 includes, for example, a global positioning system (GPS) receiver. The radio 42 includes a beacon transmitter configured to emit beacons which are, for example, signals including positional information of itself. Through use of the beacons, a position of a missing unmanned aerial vehicle can be identified, and the unmanned aerial vehicle can be promptly collected.

The radio 42 may include a receiver configured to receive commands from an external operation input device (not shown) and a transmitter configured to transmit a state of the unmanned aerial vehicle to the external operation input device. The external operation input device is, for example, a personal computer or a single-purpose input device to be operated by a user of the unmanned aerial vehicle (operator who monitors flight). The radio 42 outputs contents of the received signals to the control device 38 or transmits signals acquired from the control device 38. The unmanned aerial vehicle may include an antenna 48 to which the radio 42 is connected. The antenna 48 is mounted, for example, on the top of the apparatus main body (see FIG. 2).

The motor driving devices 40 receive electric power from the batteries 26 and supply the electric power to the motors 14 based on command values received from the control device 38. The motors 14 rotate at respective speeds which are determined based on the electric power (voltage) supplied from the motor driving devices 40. The unmanned aerial vehicle includes motor driving devices 40 provided respectively for the plurality of motors 14.

The control device 38 includes a storage device and a microprocessor configured to execute a program stored in the storage device. The control device 38 is configured to control the motors 14 based on signals (information) input from the sensors 44 and signals (information) input from the radio 42. The control device 38 controls respective rotation speeds of the plurality of motors 14 based on the signals input from the sensors 44, to thereby control a posture (pitch angle, roll angle, and yaw angle) and a movement (forward, backward, upward, downward, leftward, and rightward movements) of the unmanned aerial vehicle.

The control device 38 may determine whether or not the unmanned aerial vehicle has landed on water or the ground. Then, when it is determined that the unmanned aerial vehicle has landed on water or the ground, the control device 38 may transmit information regarding the fact of landing through the radio 42.

It is not always required that the components of the apparatus main body 16 be accommodated in the housing 46 in common. For example, a housing configured to accommodate the motor driving devices 40 and a housing configured to accommodate the control device 38 and the radio 42 may be separately provided. Moreover, a housing configured to accommodate the control device 38 and a housing configured to accommodate the radio 42 may also be separately provided.

It is desired that the housing (for example, the housing 46) configured to accommodate, for example, the motors 14, the batteries 26, the sensors 44, and the control device 38 have a waterproof function. With such a configuration, malfunction of the unmanned aerial vehicle can be avoided even when the unmanned aerial vehicle is capsized after landing on water.

The unmanned aerial vehicle includes a waterproof container 50 (see FIG. 2) configured to accommodate the package 10. The waterproof container 50 has, for example, a rectangular parallelepiped shape. The waterproof container 50 is mounted to the support frame 24. For example, the waterproof container 50 is mounted on a lower side of the frame upper portion 28. The waterproof container 50 is located on an inner side of the plurality of leg portions 34. The apparatus main body 16 is located on an upper side of the waterproof container 50.

The waterproof container 50 has a liquid-tight configuration. That is, the waterproof container 50 has such a configuration as to prevent entry of water from an outside to an inside of the waterproof container 50. With the liquid-tight configuration of the waterproof container 50, buoyancy of the waterproof container 50 can be obtained when the unmanned aerial vehicle lands on water.

Figure 4:
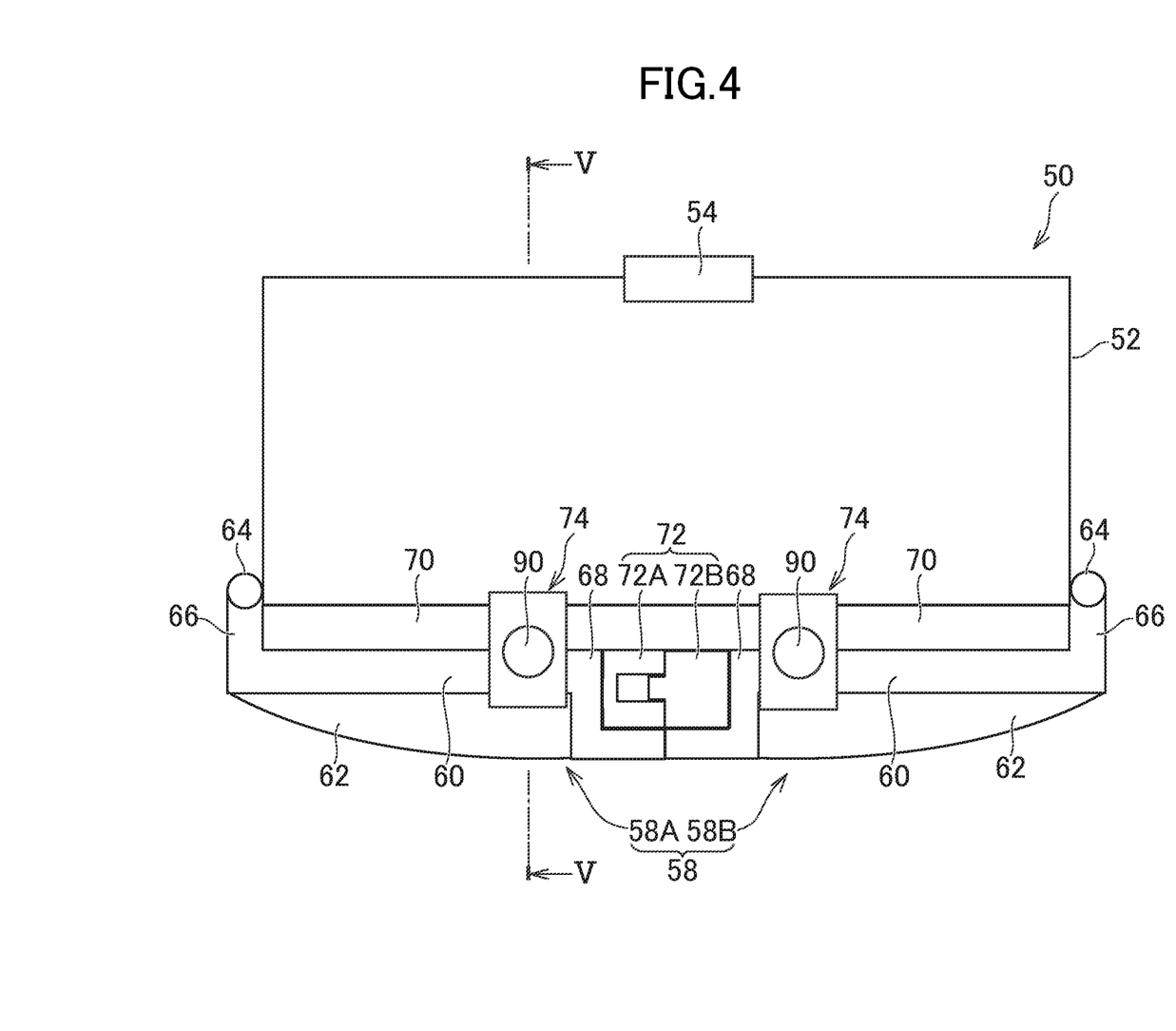
FIG. 4 is a side view for illustrating details of a waterproof container.
Figure 5:
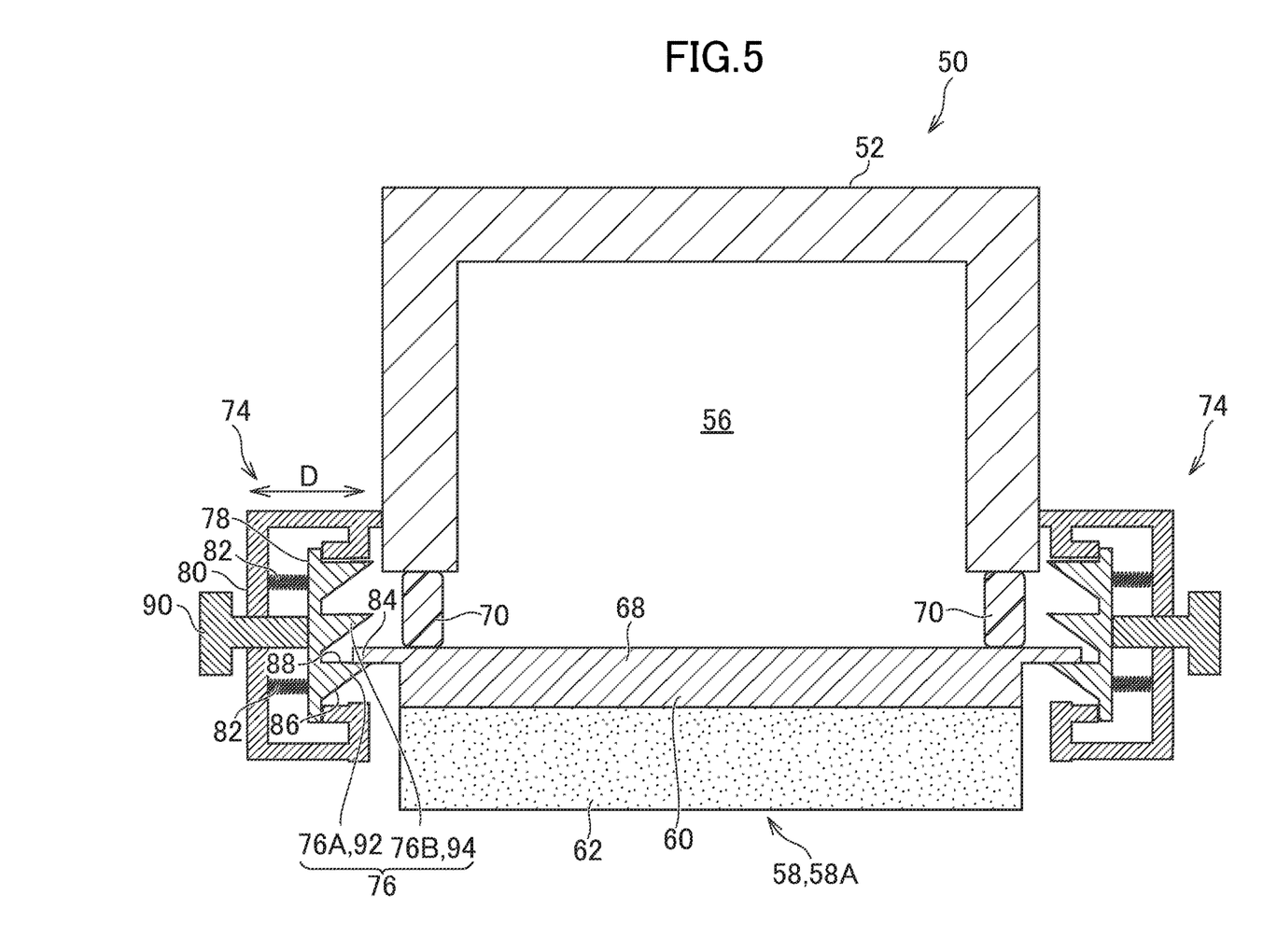
FIG. 5 is a sectional view of the waterproof container illustrated in FIG. 4, which is taken along the line V-V.

FIG. 4 is a side view for illustrating details of the waterproof container 50. FIG. 5 is a sectional view of the waterproof container 50 illustrated in FIG. 4, which is taken along the line V-V. The waterproof container 50 includes a container main body 52. The container main body 52 is made of a watertight material such as carbon, plastic, or metal.

A pressure adjustment valve 54 (for example, a check valve) is mounted to the container main body 52. The pressure adjustment valve 54 is configured to discharge gas when internal pressure increases, and may be configured to automatically close at an appropriate internal pressure.

The container main body 52 has an opening 56 in a bottom surface defined in a landed state of the unmanned aerial vehicle, allowing the package 10 (FIG. 2) to be placed in and taken out through the opening 56. A waterproof door 58 is mounted to the container main body 52 so that the opening 56 can be closed. The waterproof door 58 may be opened and closed by hand or by an actuator (not shown).

The waterproof door 58 includes door main bodies 60. The door main bodies 60 are each made of a watertight material such as carbon, plastic, or metal. The waterproof door 58 includes floats 62. For example, the floats 62 are affixed on an outer side of the door main bodies 60. The floats 62 are each, for example, a resin foam body or a bag or a box filled with gas. Examples of the resin foam body include foaming polystryrene and polyvinyl chloride foam. The floats 62 are not limited to the example of forming an entire outer surface of the waterproof door 58, and positions and shapes of the floats 62 can be modified.

Figure 6:
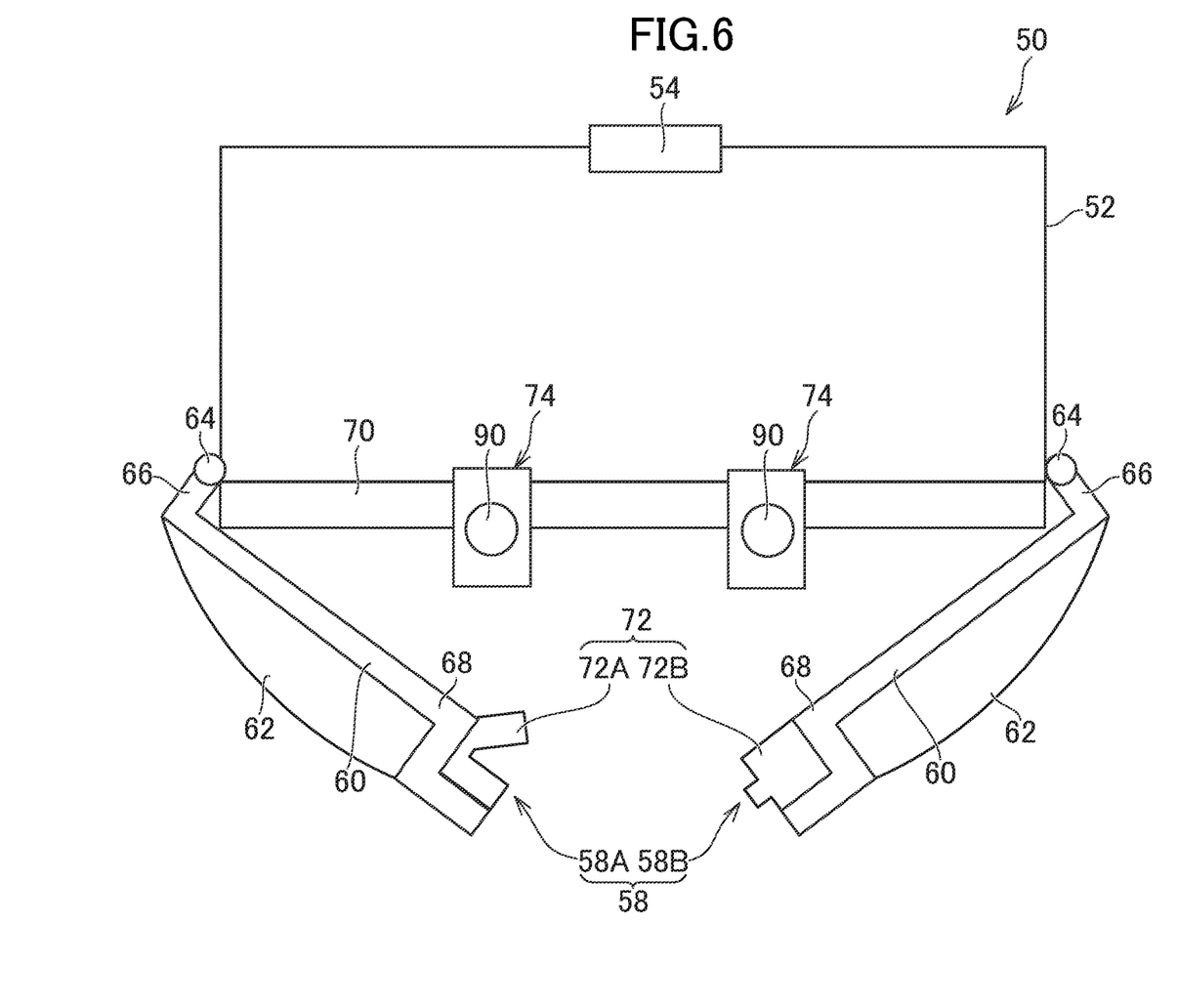
FIG. 6 is a view for illustrating a state in which a waterproof door is opened.

FIG. 6 is a view for illustrating a state in which the waterproof door 58 is opened. The waterproof door 58 is configured to open outward, and is a double door including a first door 58A and a second door 58B. The waterproof door 58 (each of the first door 58A and the second door 58B) includes a first-side end portion 66 and a second-side end portion 68. The first-side end portion 66 extends along a rotation shaft 64 for opening and closing. The second-side end portion 68 is located on a side opposite to the first-side end portion 66. An outer surface (surface of the float 62) of the waterproof door 58 (each of the first door 58A and the second door 58B) is a surface generated by translation of the rotation shaft 64 and is inclined toward the first-side end portion 66. The outer surface is a curved surface.

The waterproof container 50 includes an elastic seal 70 configured to close the waterproof door 58 in a liquid-tight manner. The elastic seal 70 is interposed between the container main body 52 and the waterproof door 58. The elastic seal 70 is compressed (elastically deformed) between the container main body 52 and the waterproof door 58. With this, a gap between the container main body 52 and the waterproof door 58 is eliminated, and hence a liquid-tight state is achieved.

An elastic seal 72 (for example, first elastic seal 72A and second elastic seal 72B) is interposed also between the first door 58A and the second door 58B. The first elastic seal 72A has a recess, and the second elastic seal 72B has a protrusion. The recess of the first elastic seal 72A and the protrusion of the second elastic seal 72B are fitted to each other. As illustrated in FIG. 6, a side wall is inclined so that the recess is widened, and hence the protrusion is easily fitted to the recess. In the example of FIG. 6, floats are not provided under the first elastic seal 72A and the second elastic seal 72B. However, the floats may be provided.

The waterproof container 50 includes locking mechanisms 74 (for example, latches) for the waterproof door 58. The locking mechanisms 74 are provided to the container main body 52 (on both sides along the rotation shafts 64) at positions corresponding to the second-side end portions 68 of the closed waterproof door 58 (on the side opposite to the rotation shafts 64) as illustrated in FIG. 5. The locking mechanisms 74 each include a locking component 78 having a plurality of claws 76 (first claw 76A and second claw 76B) arranged next to each other. The locking component 78 is held by a mounting portion 80 for mounting to the container main body 52 so that only linear movement in a direction D along the rotation shaft 64 is allowed. Moreover, the locking component 78 is provided on an outer side of the waterproof door 58, and a spring 82 is compressed so that a force in a direction of approaching the waterproof door 58 acts on the locking component 78.

When the waterproof door 58 is closed, a part of the waterproof door 58 (engagement portion 84) is brought into abutment against an inclined outer surface 86 of the first claw 76A. The inclined outer surface 86 is inclined with respect to the direction of the linear movement of the locking component 78. The inclined outer surface 86 is inclined in a direction toward an opening/closing path of the waterproof door 58. Therefore, when the engagement portion 84 of the waterproof door 58 pushes the outer surface, the locking component 78 moves in a direction of separating away from the waterproof door 58 against a force of the spring 82. Then, the engagement portion 84 is engaged with an inner surface 88 of the first claw 76A. The inner surface 88 is, for example, parallel to the direction of the linear movement of the locking component 78, and is not inclined.

A pin 90 is mounted to the locking component 78. The engagement between the first claw 76A and the engagement portion 84 can be canceled by pulling the pin 90 in the direction of separating away from the waterproof door 58 against the force of the spring 82.

The waterproof container 50 includes a first door-closing mechanism 92 (for example, the first claw 76A). The first door-closing mechanism 92 is included in the locking mechanism 74 having a plurality of locking levels (two or more locking levels). A first door-closing state of the waterproof door 58 is retained by the first door-closing mechanism 92. As illustrated in FIG. 4, a state in which the first door 58A and the second door 58B are engaged with the first claws 76A (FIG. 5) is the first door-closing state. In the first door-closing state, the compression of the elastic seal 70 is small, and hence hermetic sealing is insufficient in some cases.

Figure 7:
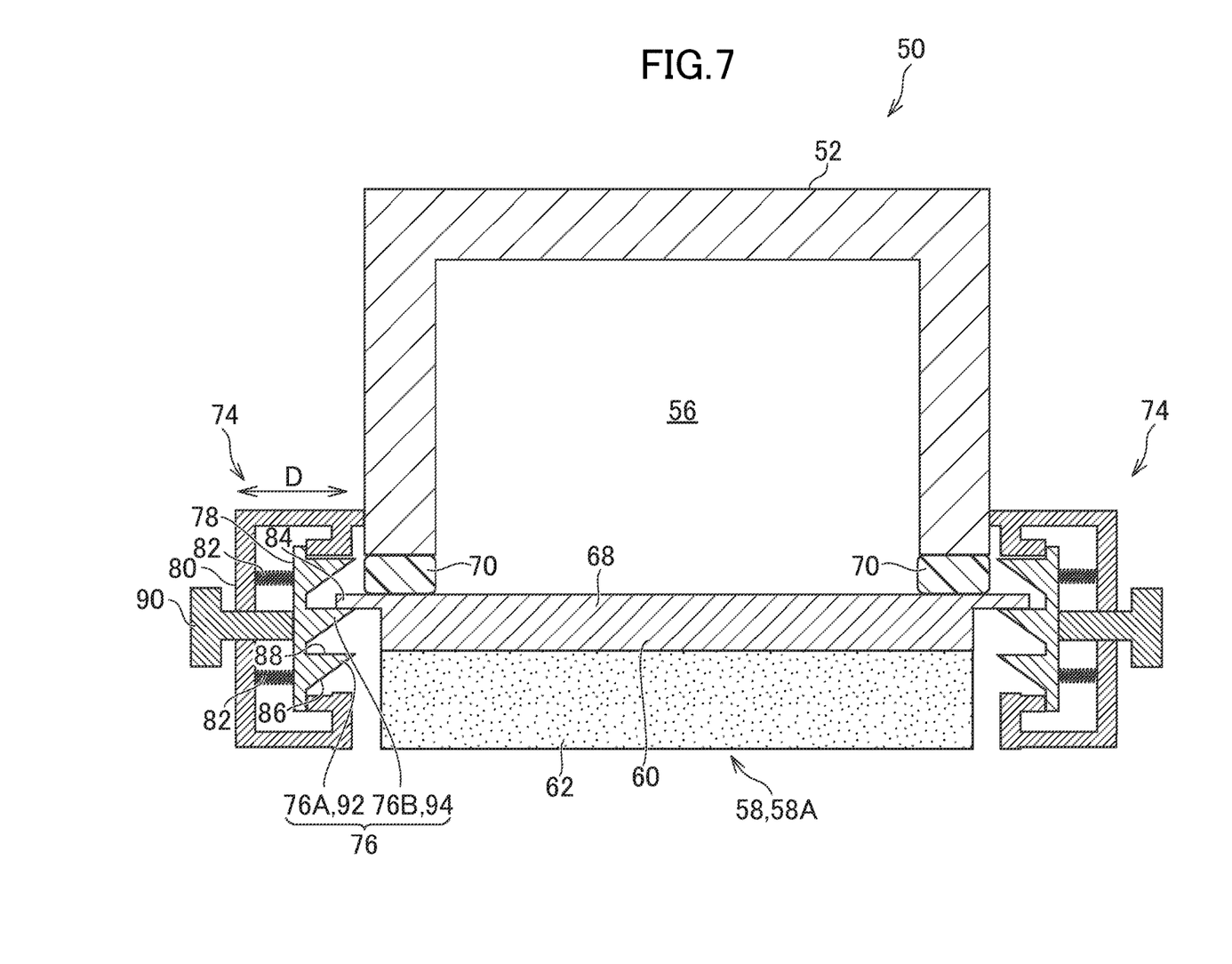
FIG. 7 is a view for illustrating a second door-closing state of the waterproof door.

FIG. 7 is a view for illustrating a second door-closing state of the waterproof door 58. The waterproof container 50 includes a second door-closing mechanism 94 (for example, the second claw 76B). The second door-closing mechanism 94 is included in the locking mechanism 74 having a plurality of locking levels. In the second door-closing state, the second door-closing mechanism 94 prevents movement of the waterproof door 58 in a door-opening direction. The second door-closing state is a state in which the waterproof door 58 has been pushed in a direction of resisting against an elastic force of the elastic seal 70 from the first door-closing state. For example, in some cases, the waterproof door 58 is pushed when the unmanned aerial vehicle lands on water.

According to this embodiment, when the waterproof door 58 is pushed by the external force, the hermetic sealing with the waterproof door 58 can be enhanced from the first door-closing state to the second door-closing state, thereby being capable of securing the hermetic sealing of the waterproof container 50. In particular, when the outer surface of the waterproof door 58 is the curved surface, the external force is more likely to act in a direction of enhancing the hermetic sealing. Examples of the external force include impact generated by collision between the waterproof door 58 and water and buoyancy generated in the floats 62.

Figure 8:
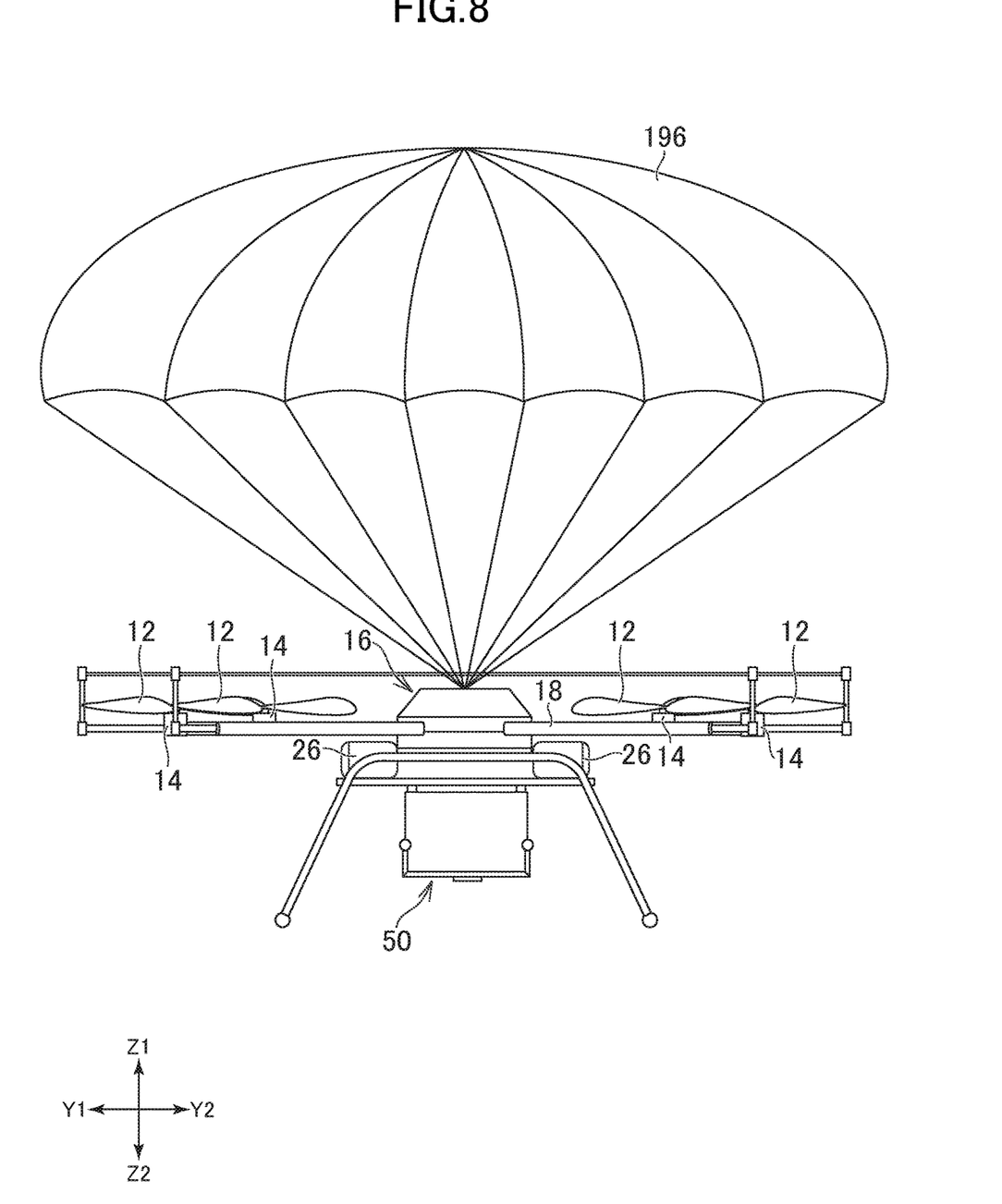
FIG. 8 is a view for illustrating a first modification example of the unmanned aerial vehicle according to the embodiment.

FIG. 8 is a view for illustrating a first modification example of the unmanned aerial vehicle according to the embodiment. The hermetic sealing with the waterproof door 58 described above can be enhanced when the unmanned aerial vehicle lands on water. However, it is desired that the unmanned aerial vehicle land on water under a state in which the waterproof door 58 is oriented downward. Therefore, the unmanned aerial vehicle includes a parachute 196 as illustrated in FIG. 8. The parachute 196 is configured to open, for example, when abnormality of the unmanned aerial vehicle is detected. With this, the waterproof container 50 can land on water under the state in which the waterproof door 58 is oriented downward, that is, while the unmanned aerial vehicle takes a horizontal posture or a posture close to the horizontal posture.

Figure 9:
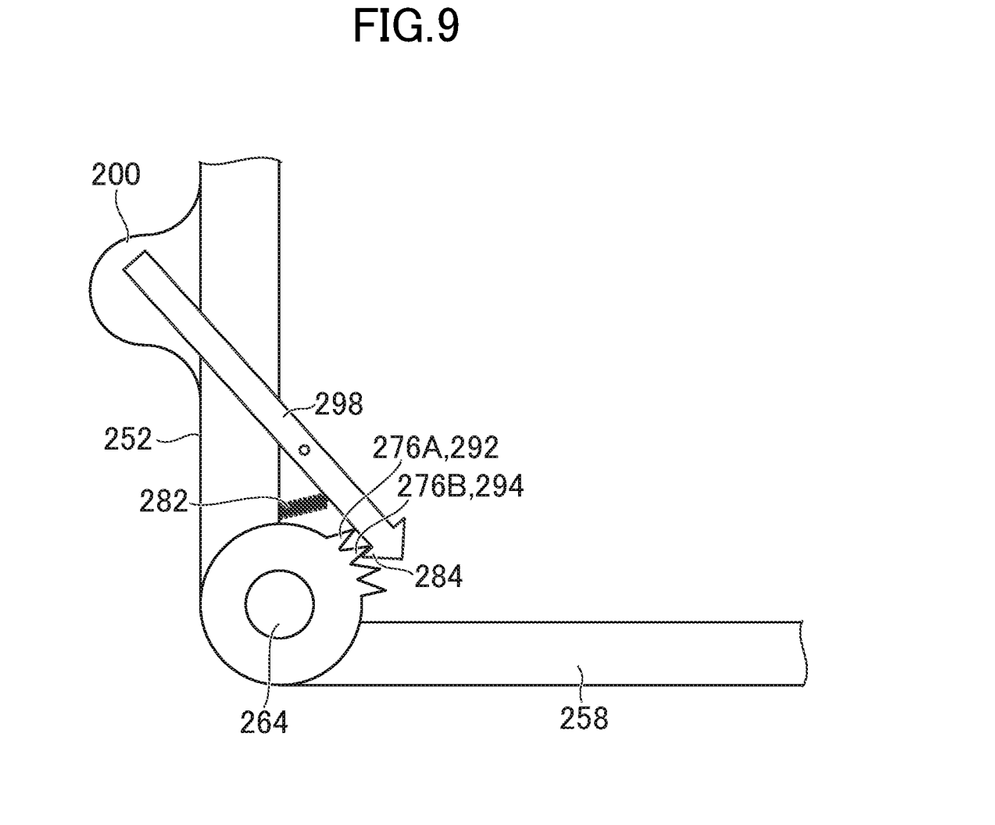
FIG. 9 is a view for illustrating a second modification example of the unmanned aerial vehicle according to the embodiment.

FIG. 9 is a view for illustrating a second modification example of the unmanned aerial vehicle according to the embodiment. In this example, a first door-closing mechanism 292 (for example, first claw 276A) and a second door-closing mechanism 294 (for example, second claw 276B) are provided around a rotation shaft 264 of a waterproof door 258. When the waterproof door 258 is opened or closed, the first claw 276A and the second claw 276B move around the rotation shaft 264.

Movement of the first claw 276A and the second claw 276B in a direction of opening the waterproof door 258 is prevented by an engagement portion 284. The engagement portion 284 is formed integrally with a lever 298. The lever 298 is mounted to a container main body 252 so as to be swingable about a shaft extending parallel to the rotation shaft 264 of the waterproof door 258. Moreover, a force in a direction in which the engagement portion 284 approaches the first claw 276A and the second claw 276B is caused to act on the lever 298 by an extended spring 282. When the waterproof door 258 moves in a closing direction, the lever 298 swings so as to cause the engagement portion 284 to be pushed up by the first claw 276A and the second claw 276B. With this, the waterproof door 258 can be closed without being regulated by the engagement portion 284. In order to cancel the first door-closing state or the second door-closing state, it is only required that the lever 298 be moved in a direction in which the engagement portion 284 separates away from the first claw 276A or the second claw 276B. Moreover, the lever 298 penetrates the container main body 252. Therefore, the penetrating part is covered with a cover 200 for waterproofing.

The present invention is not limited to the embodiment described above, and various modifications may be made thereto. For example, the structure described in the embodiment may be replaced by substantially the same structure, a structure having the same action and effect, and a structure which may achieve the same object.

The invention claimed is:

1. An unmanned aerial vehicle comprising a waterproof container configured to accommodate a package,
    the waterproof container including:
        a container main body having an opening in a bottom surface;
        a waterproof door mounted to the container main body so as to translate outward and downward so as to open and close the opening;
        an elastic seal, which is interposed between the container main body and the waterproof door, and which is configured to close the waterproof door in a liquid-tight manner;
        a first door-closing mechanism configured to retain a first door-closing state of the waterproof door; and
        a second door-closing mechanism configured to prevent movement of the waterproof door in a door-opening direction in a second door-closing state in which the waterproof door has been pushed in a direction of further compressing an elastic force of the elastic seal from the first door-closing state, when a landing surface contacts the waterproof door when the unmanned aerial vehicle is provided in a landed state.

2. The unmanned aerial vehicle according to claim 1, wherein the waterproof door is a double door including a first door and a second door.

3. The unmanned aerial vehicle according to claim 2, wherein the elastic seal is also interposed between the first door and the second door.

4. The unmanned aerial vehicle according to claim 1, wherein the first door-closing mechanism and the second door-closing mechanism are included in a locking mechanism having a plurality of locking levels.

5. The unmanned aerial vehicle according to claim 1, further comprising a pressure adjustment valve mounted to the container main body.

6. The unmanned aerial vehicle according to claim 1, wherein the waterproof door includes a float.

7. The unmanned aerial vehicle according to claim 1, wherein the waterproof door includes:
    a first-side end portion extending along a rotation shaft for opening and closing; and
    a second-side end portion located on a side opposite to the first-side end portion, and
    wherein an outer surface of the waterproof door is a surface generated by translation of the rotation shaft and is inclined toward the first-side end portion.

8. The unmanned aerial vehicle according to claim 7, wherein the outer surface is a curved surface.

9. The unmanned aerial vehicle according to claim 1, further comprising a parachute.

10. The unmanned aerial vehicle according to claim 1, further comprising a radio configured to perform at least one of transmission or reception of signals.

* * * * *